United States Patent Office 3,049,531
Patented Aug. 14, 1962

3,049,531
CATALYZED PROCESS FOR THE MODIFICATION
OF OLEFIN POLYMERS
William M. Le Suer, Cleveland, Ohio, assignor to The Lubrizol Corporation, Wickliffe, Ohio, a corporation of Ohio
No Drawing. Filed Feb. 23, 1960, Ser. No. 10,104
9 Claims. (Cl. 260—139)

This invention relates to an improved process for the conversion of certain olefin polymers to products containing phosphorus and sulfur. It relates in a more particular sense to such a process by which improved phosphorus- and sulfur-containing products can be prepared.

The reaction of olefin polymers with inorganic phosphorus- and sulfur-containing reagents has long been known as a convenient source of products containing phosphorus and sulfur which are useful as intermediates in the preparation of a wide variety of commercially attractive compositions. Generally these products are reacted further with metal bases to produce the corresponding metal salts and these metal salts then are used in such applications as the rust-proofing of ferrous metal surfaces, inhibitors of corrosion in crankcase lubricants, paint driers, stabilizers of vinyl chloride polymers, and many other commercial uses. In almost all of these commercial uses it is desirable and frequently necessary that the metal salt of the phosphorus- and sulfur-containing acidic product of this process be light in color. The reason for this, of course, is that a light colored product of any sort is more appealing to the buyer than a similar dark colored product.

Many different types of products are available from the reaction of olefin polymers with phosphorus- and sulfur-containing inorganic reagents. These differences are associated with the differences in types of phosphorus- and sulfur-containing reagents. Thus these reagents include phosphorus pentasulfide, thiophosphoryl chloride, phosphorus trisulfide, a combination of phosphorus trichloride and sulfur, and many others. The latter, a combination of phosphorus trichloride and sulfur, may be reacted with olefin polymers to give a particularly useful product which may be further treated with steam and then with a basic neutralizing agent to yield a product useful as an additive in crankcase lubricants. Such a product, i.e., the final metal salt must as indicated above have a desirably light color to be acceptable to those who formulate the finished crankcase lubricant, and it has been noted that metal salts prepared by the reaction of an olefin polymer with phosphorus trichloride and elemental sulfur are characterized by a somewhat darker shade of color than that which is ordinarily acceptable to the trade. The performance characteristics of this metal salt when used as an additive for crankcase lubricants are excellent, however, so that this material is valuable in spite of its unsatisfactory color.

It is apparent that an improvement in the color of such a product would enhance its usefulness to a marked degree and it is accordingly a principal object of this invention to provide an improved process for the preparation of phosphorus- and sulfur-containing metal salts.

A further object of the present invention is the provision of a process which comprises the reaction of an olefin polymer with phosphorus trichloride and sulfur, to produce a light colored product.

Still a further object of the present invention is the provision of a process which comprises the reaction of an olefin polymer with phosphorus trichloride and sulfur followed by hydrolysis to produce a light colored product.

These and other objects are accomplished by the process for the preparation of phosphorus- and sulfur-containing compositions which comprises heating at a temperature above about 140° C. a mixture of an olefin polymer, phosphorus trichloride, sulfur and an active hydrogen compound selected from the group consisting of water and hydrogen sulfide, the molar ratio of the total amounts of sulfur and the active hydrogen compound used to the amount of phosphorus trichloride used being at least about 1:1, and the molar ratio of the amount of the active hydrogen compound used to the amount of sulfur used being from about 0.05:1 to about 2:1. The phosphorus- and sulfur-containing compositions obtained by the above process are readily susceptible to hydrolysis by treatment with water or steam at a temperature above about 80° C. to form acidic products. These hydrolyzed products are further susceptible to treatment with basic metal compounds to form the corresponding metal salts. Such metal salts may be derived also by prior treatment of the phosphorus- and sulfur-containing product of the process of this invention with the basic metal compound and then hydrolysis of this material.

It will be noted that the ultimate problem of color with respect to the products of this invention is associated with the color of the metal salt of the phosphorus- and sulfur-containing compositions. The color of the product of the above process is important, however, because it is an accurate indication of the color of the metal salt which is obtained from such acidic product, viz., if the product is light in color, then the metal salt prepared from such a product will likewise be light. The problem of color of the metal salt, therefore, can be solved by improving the color of the phosphorus- and sulfur-containing compositions from which the metal salt is prepared.

The polymeric reactant of the process of this invention is a polymer of a lower mono-olefin, viz., a polymer of ethylene, propene, 1-butene, and isobutene. In many cases the polymer is a homopolymer of isobutene. Other polymers, including copolymers, are also contemplated, but such copolymers are those characterized by a large proportion, i.e., at least 90 percent of lower aliphatic mono-olefin units. Thus such copolymers are exemplified by copolymers of 90 percent isobutene and 10 percent styrene, i.e., where the percentage of styrene units is relatively small. Other homopolymers of lower mono-olefins are also contemplated. Polyisopropenes and polyethylenes have been found to be useful in this process and they are of course included within the scope of this invention. The molecular weight of the polymeric reactant may vary within wide limits. For the most part polymers having molecular weights in the range of from about 250 to about 3000 are preferred because they provide reaction products which are especially useful. Polymers having molecular weights outside this range are also suitable; diisobutylene for example has been found to be useful and at the other end of the scale polymers having molecular weights of 50,000 or higher have been used with success. A particularly useful product is one prepared from a polyisobutene having a molecular weight of 50,000.

Polyisobutenes having molecular weights of from about 250 to about 3,000 are preferred because of the solubility and viscosity characteristics of the reaction products which result from their use. These are readily available materials and can be prepared conveniently by polymerization of isobutene at temperatures within the range of —60° C. to 40° C. in the presence of an ionic catalyst such as boron fluoride. The preparation of such relatively low molecular weight polymers is exemplified by the following process: A hydrocarbon mixture containing about 25 percent of isobutene is cooled to about —15° C. and from about 0.1 percent to about 2 percent of boron fluoride based upon the isobutene content of the material used is added with vigorous agitation. The exothermic nature of the polymerization causes it to require efficient cooling. When the polymerization has subsided the reaction mass is neutralized and washed free of acidic substances resulting from decomposition of the catalyst. The resulting polymer is separated from the unreacted hydrocarbons by distillation. The residual polymer so obtained, depending upon the temperature of reaction contains polymeric chains having molecular weights within the range of 250 to 3000.

The process of this invention is believed to involve at least in part a reaction of the olefin polymer with sulfur resulting in sulfurization of the polymer, followed by a reaction of this sulfurized polymer with the phosphorus trichloride. The presence of the active hydrogen compound is responsible for the improved color of the product which results. The presence of such active hydrogen compound acts also to assist the incorporation of phosphorus into the polymer.

The relative amounts of the reactants used in this process may, as indicated above, be varied within broad ranges. The amount of phosphorus trichloride used may be varied for example from about 0.5 mole to as much as 60 moles or even more, per mole of the olefin polymer used, depending primarily upon the molecular weight of the olefin polymer and the amount of phosphorus desired in the reaction product. The higher the molecular weight of the olefin polymer, the greater the amount of phosphorus trichloride which may be used.

The relative amounts of sulfur and the active hydrogen compound to be used in this process are critical. Thus, in order to incorporate a maximum amount of phosphorus into the olefin polymer, the molar ratio of the total amounts of sulfur and active hydrogen compound used to the amount of phosphorus trichloride used should be at least 1:1 and is preferably within the limits of 1:1 to 2:1. If the molar ratio is less than 1:1, then the excess phosphorus trichloride appears not to react. On the other hand, greater amounts of sulfur and the active hydrogen compound may be used, but such increased amounts do not appear to have any additional beneficial effect.

The amount of the active hydrogen compound to be used in this process should be at least 0.05 mole but no greater than 2 moles per mole of sulfur used. The use of this component in amounts outside this range will give unsatisfactory product either from the standpoint of color or the amount of phosphorus incorporated into the product. A particularly preferred range of concentration of the active hydrogen compound is from about 0.2 mole to about 1 mole per mole of sulfur used.

The process may be carried out simply by mixing the reactants in any order and heating the mixture at the desired temperature. Thus the sulfur phosphorus trichloride and the active hydrogen compound may be added concurrently to the olefin polymer; or alternatively a mixture of the polymer, sulfur and the active hydrogen compound may be prepared first and the phosphorus trichloride added to this mixture. The minimum temperature at which the process can be carried out satisfactorily is about 140° C. In view of the fact that phosphorus trichloride boils at a temperature considerably below this reaction temperature, it is often desirable to add the phosphorus trichloride portionwise to the hot reaction mixture. Furthermore, the reaction vessel should ordinarily be equipped with means for returning the volatilized unreacted phosphorus trichloride to the system. Such means in most cases can be provided by a reflux condenser. In order to minimize the loss of unreacted phosphorus trichloride it also is desirable in many cases to add this reagent by introducing it beneath the surface of the reaction medium and thereby causing it to bubble up through the mixture. The temperature limits within which the process may be carried out range from about 140° C. to about 250° C. The higher temperature represents the upper practical limit of the range. Higher temperatures such as 300° C. or even higher may be employed, but with no advantage and in some cases with the disadvantages of some decomposition of the constituents of the process mixture.

The active hydrogen compounds of this invention include water and hydrogen sulfide. The ability of such compounds to improve the color of the product of this process appears to be associated with the presence of the active hydrogen in such compound, although the exact mechanism by which such improvement is effected is not known.

The product which results from the above process contains phosphorus, sulfur and chlorine. The chlorine is fairly reactive. Treatment of such product with water or steam results in hydrolysis of most of the chlorine and the removal also of a considerable proportion of the sulfur. The product of the hydrolysis is, as indicated before, an acid, and is readily susceptible to neutralization by treatment with basic metal compounds to form neutral or basic metal salts. The hydrolysis is usually carried out at temperatures above about 80° C., preferably between 110° and 200° C. Steam is preferred for effecting the hydrolysis.

The invention may be illustrated in more detail by the following examples in which the NPA (National Petroleum Association) color rating is a numerical index of the color of a sample as determined by visual comparison of a 5 percent solution by weight (in oil) of the sample with a series of different colored standards, ranging from a light lemon colored standard having a rating of 0 to a deep red standard having a rating of 8. The oil used as the solvent for the samples has a rating of 1.5. It will be noted that the products of this invention have NPA color ratings less than 5, whereas the NPA color ratings of the products of the prior art process (Examples 10 and 11) are 8 and 6.5 respectively.

*Example 1*

To a mixture of 750 grams (0.29 mole) of a polyethylene having a molecular weight of 2600 and 20.5 grams (0.64 mole) of sulfur, there are added concurrently at 160° to 165° C. within a period of one hour, 103 grams (0.75 mole) of phosphorus trichloride and 15 grams (0.44 mole) of hydrogen sulfide beneath the surface of the mixture. After the addition, the mixture is heated at 160° C. for 5 hours and then to 165° C./30 mm. Hg. The residue has the following analysis:

| | |
|---|---|
| Percent P | 2 |
| Percent S | 3.1 |
| Percent Cl | 2.7 |
| NPA color | 1.5 |

*Example 2*

The product of Example 1 is diluted with 375 grams of mineral oil and then treated with steam at 140° to 160° C. for one hour. The hydrolyzed product is dried by heating at 150° to 165° C./25 mm. Hg for two hours. The dried product has the following analysis:

| | |
|---|---|
| Percent P | 1.3 |
| Percent S | 1 |
| Percent Cl | 0.6 |
| NPA Color | 2.5 |

*Example 3*

To a mixture of 750 grams (1 mole) of a polyisobutene having an average molecular weight of 750 and 32 grams (1 mole) of sulfur there is added at 150° to 160° C. 138 grams (1 mole) of phosphorus trichloride in 2.5 hours during which period 6.1 grams (0.18 mole) of hydrogen sulfide is bubbled into the reaction mixture. The mixture then is heated at 165° C. for 1.5 hours at 160° C./50 mm. Hg for one hour, diluted with 375 grams of mineral oil, and treated with steam at 150 to 160° C. for two hours. The hydrolyzed product is dried at 160° to 170° C. The residue is found to have the following analysis:

Percent P __ 1.1.
Percent S __ 1.
NPA color __ 2 (1% oil solution), 4.5 (10% oil solution).

Example 4

A mixture of 750 grams (1 mole) of a polyisobutene having a molecular weight of 750, 40 grams (1.25 moles) of sulfur, 9 grams (0.5 mole) of water is heated to 150° C. To this mixture there is added 138 grams (1 mole) of phosphorus trichloride at 150° to 165° C. for 3.5 hours. The mixture then is heated at 140° to 165° C. for 26 hours at 160 to 165° C./15 mm. Hg for 0.5 hour, diluted with 375 grams of mineral oil, and treated with steam at 140 to 150° C. for 1.5 hours. The hydrolyzed product is dried at 140° C./15 mm. Hg mercury for 1.5 hours and filtered. The filtrate is found to have the following analysis:

Percent P ____ 2.1
Percent S ____ 1.5
NPA color ____ 4

Example 5

A mixture of 405 grams (0.008 mole) of a polyisobutene having a molecular weight of 50,000, 660 grams of mineral oil, 10.5 grams (0.33 mole) of sulfur, and 63 grams (0.46 mole) of phosphorus trichloride is heated to 115° to 130° C. Hydrogen sulfide is introduced beneath the surface of this mixture at 130° to 200° C. at a rate of 12 grams per hour for 11 hours. A total of 13 grams (0.34 mole) of hydrogen sulfide is thus added. The reaction mass is cooled to 145° C. and treated with steam for five hours at 155° C. The hydrolyzed product is dried at 155° C. for 0.5 hour and the dry, acidic product is found to have the following analysis:

Percent P ____ 0.85
Percent S ____ 0.4
NPA color ____ 4

Example 6

A mixture of 167 grams (1.5 moles) of diisobutene and 48 grams (1.5 moles) of sulfur is heated to reflux temperature and then treated simultaneously and dropwise with 206 grams (1.5 moles) of phosphorus trichloride and 13.5 grams (0.75 mole) of water over a period of two hours. The resulting material is heated to 104° C./28 mm. Hg and filtered again. The filtrate is found to have the following analysis:

Percent P ____ 6.1.
Percent S ____ 10.3.
NPA color ____ Less than 3.

Example 7

A mixture of 252 grams (1.5 moles) of triisobutene and 48 grams (1.5 moles) of sulfur is heated at reflux temperature for 1.5 hours. To this mixture, there are added 309 grams (2.25 moles) of phosphorus trichloride and 13.5 grams (0.75 mole) of water over a period of three hours. The mixture is maintained at this temperature for two hours, then filtered and heated to 150° C./25 mm. Hg. The residue is found to have the following analysis:

Percent P ____ 14.5.
Percent S ____ 21.3.
NPA color ____ Less than 3.

Example 8

A barium salt of the hydrolyzed acidic product of Example 5 is prepared as follows: 110 parts (by weight) of the product of Example 5 is heated for three hours at 130 to 138° C. with a mixture of 40 parts of mineral oil, 1.2 parts of water and 6.3 parts of barium oxide. The neutralized product is filtered, and the filtrate is found to have the following analysis:

Percent P ____ 0.3
Percent Ba ____ 1.2
Acid number ____ 0.9
NPA color ____ 3

Example 9

To a solution of 520 grams (0.01 mole) of a polyisobutene having a molecular weight of 50,000 in 680 grams of a mineral oil there are added concurrently at 170° C. 8.4 grams (0.26 mole) of sulfur, 71 grams (0.52 mole) of phosphorus trichloride and 15 grams (0.44 mole) of hydrogen sulfide in two hours. The resulting mixture is heated at 190° to 210° C. for 10 hours and then at 170° C./20 mm. Hg. The residue is diluted with 210 grams of mineral oil, blown with steam at 130° to 150° C. for two hours, dried at 160° C./20 mm. Hg and filtered. The filtrate has the following analysis:

Percent P ____ 0.93
Percent S ____ 0.36
NPA color ____ 4.5

Example 10

To a mixture of 64 grams (2 moles) of sulfur and 750 grams (1 mole) of polyisobutene having an average molecular weight of 750, there is added portionwise at 150° to 155° C., 276 grams (2 moles) of phosphorus trichloride throughout a period of four hours. The mixture is heated at 150° to 160° C. for five hours and then at 160° C./28 mm. Hg for one hour. The residue is diluted with 375 grams of mineral oil whereupon steam is passed through the mixture at 150° to 160° C. for two hours. The product is dried by heating at 150° to 160° C./28 mm. Hg for 1.5 hours and then has the following analysis:

Percent P ____ 3.2
Percent S ____ 1.4
NPA color ____ 8

Example 11

A mixture of 40 grams (1.25 moles) of sulfur and 750 grams (1 mole) of polyisobutene having an average molecular weight of 750 is heated to 160° C. To this mixture there is added portionwise at 160° to 165° C. 138 grams (1 mole) of phosphorus trichloride during a period of three hours. The mixture is heated at 160° to 165° C. for three hours and then at 150° to 160° C./35 mm. for 1.5 hours. The residue is diluted with 375 grams of mineral oil whereupon steam is passed through the mixture at 145° to 160° C. for two hours. The product then is dried by heating at 150° to 155° C./35 mm. Hg for one hour and is found to have the following analysis:

Percent P ____ 1.9
Percent S ____ 1.6
NPA color ____ 6.5

The compositions of this invention are useful as intermediates for the preparation either of neutral or basic metal salts which are effective as dispersing agents in aqueous or hydrocarbon oil compositions. They are useful also as insecticides, ore-flotation agents, etc. A specific example of the utility of such compositions is as follows:

An insecticidal composition is prepared by mixing 95 parts (by weight) of water, 0.5 part of sodium dodecylbenzene sulfonate and 4.5 parts of a 20 percent solution of the product of Example 1 in xylene. The aqueous composition may be sprayed on vegetation and is effective for the control of aphids.

Other modes of applying the principle of this invention may be employed, change being made as regards the details described, provided the features stated in any of the following claims or the equivalent of such be employed.

I therefore particularly point out and distinctly claim as my invention:

1. The process of preparing phosphorus- and sulfur-containing compositions which comprises heating at a temperature above about 140° C. a mixture of an olefin polymer, phosphorus trichloride, sulfur, and an active hydrogen compound selected from the group consisting of water and hydrogen sulfide, the molar ratio of the total amounts of sulfur and the active hydrogen compound used to the amount of phosphorus trichloride used being at least about 1:1, and the molar ratio of the amount of the active hydrogen compound to the amount of sulfur used being from about 0.05:1 to about 2:1.

2. The process of claim 1 characterized further in that the olefin polymer is a polymer of isobutene.

3. The process of claim 1 characterized further in that the olefin polymer is a polymer of isobutene having a molecular weight within the range of 250–3000.

4. The process of preparing phosphorus- and sulfur-containing acidic compositions which comprises heating at a temperature above about 140° C. a mixture of an olefin polymer, phosphorus trichloride, sulfur, and an active hydrogen compound selected from the group consisting of water and hydrogen sulfide, the molar ratio of the total amounts of sulfur and the active hydrogen compound used to the amount of phosphorus trichloride used being at least about 1:1, and the molar ratio of the amount of the active hydrogen compound used to the amount of sulfur used being from about 0.05:1 to about 2:1, and treating the resulting mass with water at a temperature within the range of about 100° C. and 200° C.

5. The process of claim 4 characterized further in that the active hydrogen compound is water.

6. The process of claim 4 characterized further in that the active hydrogen compound is hydrogen sulfide.

7. The process of preparing phosphorus- and sulfur-containing acidic compositions which comprises heating at a temperature above about 140° C. a mixture of a polymer of isobutene, phosphorus trichloride, sulfur, and hydrogen sulfide, the molar ratio of the total amounts of sulfur and hydrogen sulfide used to the amount of phosphorus trichloride used being about 1:1 and the molar ratio of the amount of hydrogen sulfide used to the amount of sulfur used being about 1:1, and treating the resulting mass with steam at a temperature within the range of about 140° C. to about 180° C.

8. The process of claim 7 characterized further in that the olefin polymer is a polyisobutene having a molecular weight of about 50,000.

9. The product of the process of claim 1.

References Cited in the file of this patent

UNITED STATES PATENTS

| | | |
|---|---|---|
| 2,822,332 | Logan | Feb. 4, 1958 |
| 2,900,378 | Miller | Aug. 18, 1959 |